Figure 1:
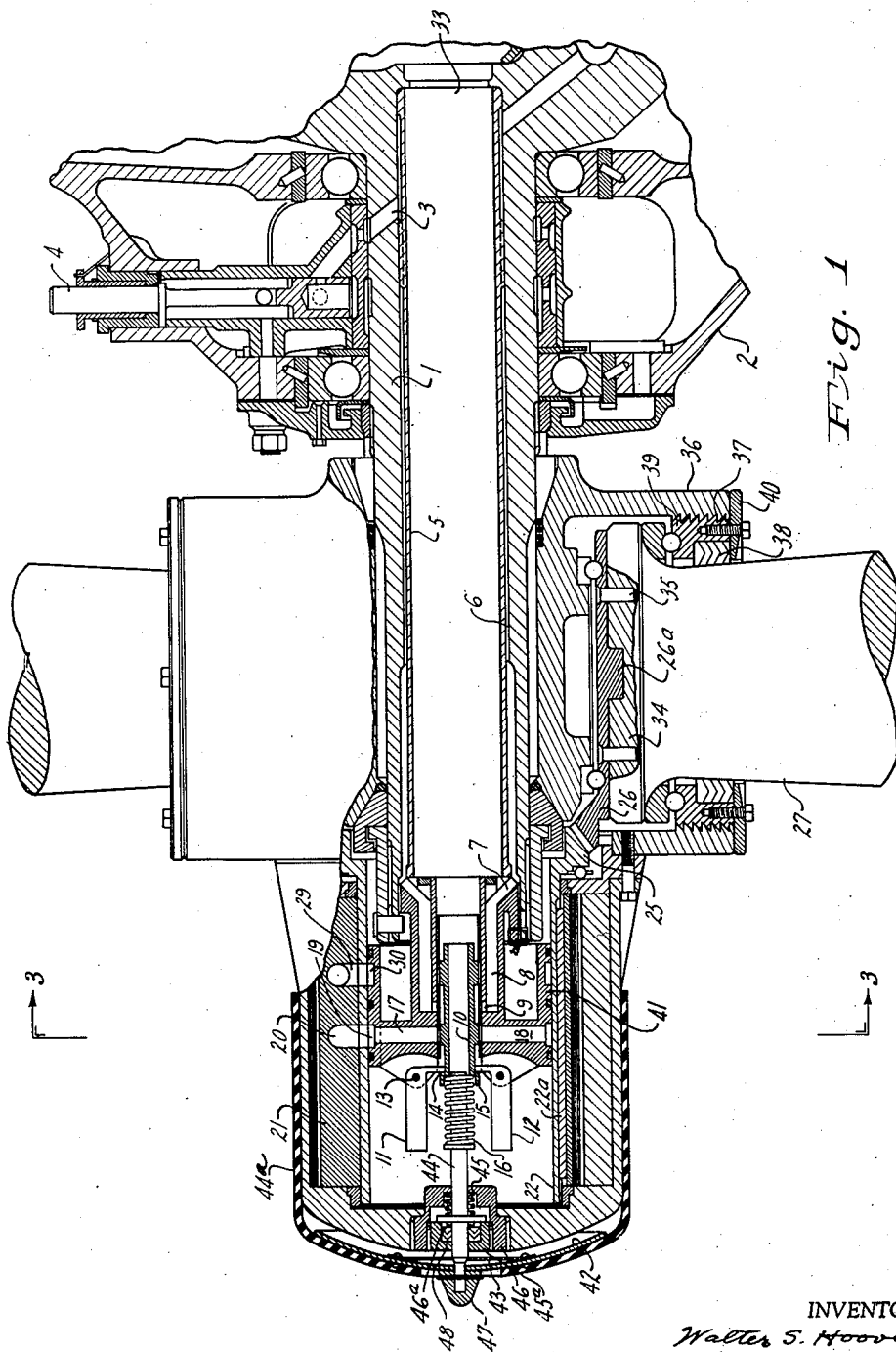

April 18, 1944. W. S. HOOVER 2,347,104
COMBINED SPEED AND VELOCITY RESPONSIVE
VARIABLE PITCH PROPELLER MECHANISM
Filed March 14, 1941 3 Sheets-Sheet 2

INVENTOR.
Walter S. Hoover
William B. Jaspert
BY Attorney.

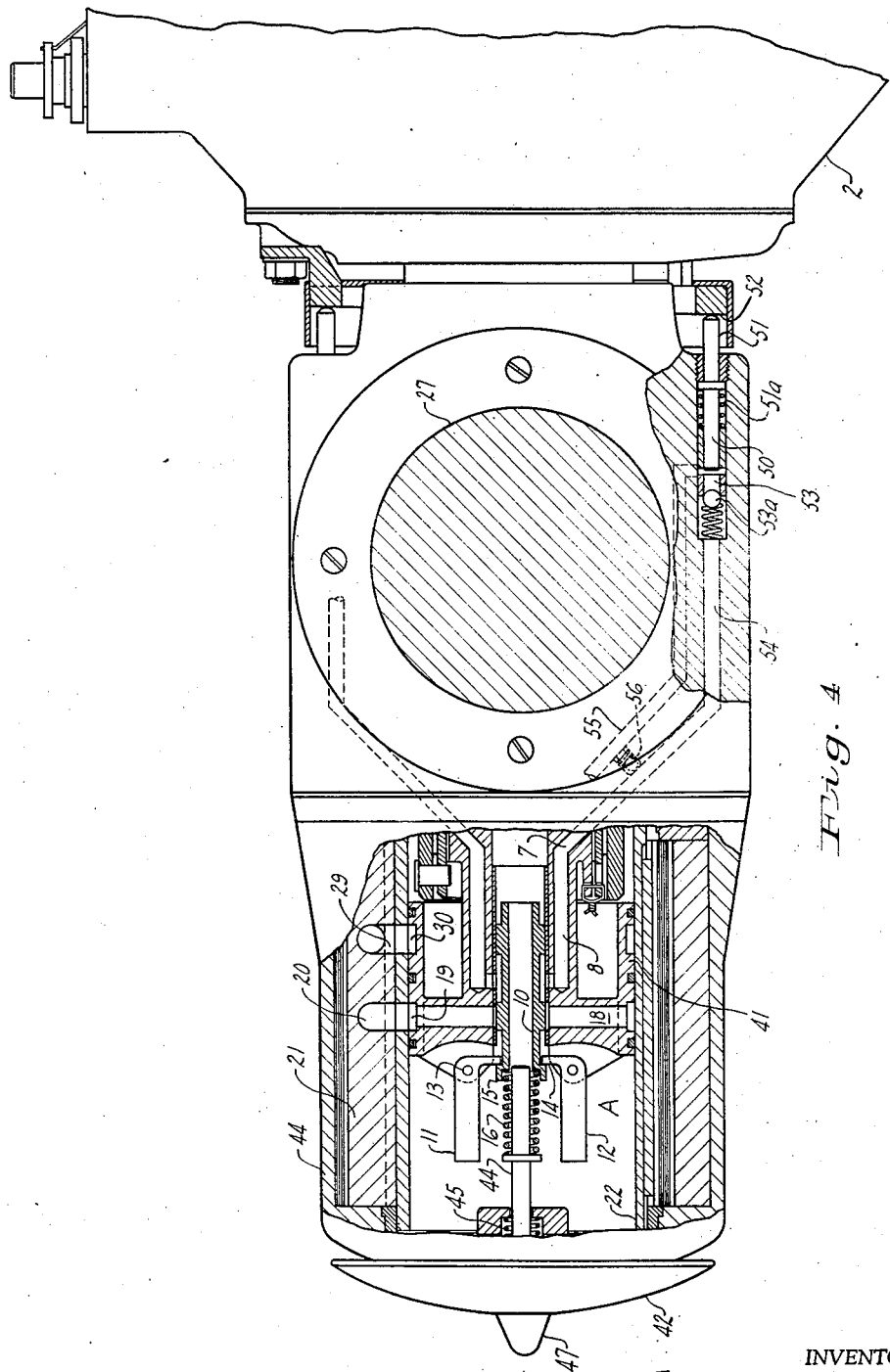

Patented Apr. 18, 1944

2,347,104

UNITED STATES PATENT OFFICE 2,347,104

COMBINED SPEED AND VELOCITY RESPONSIVE VARIABLE PITCH PROPELLER MECHANISM

Walter S. Hoover, Montreal, Quebec, Canada

Application March 14, 1941, Serial No. 383,390

11 Claims. (Cl. 170—163)

This invention relates to new and useful improvements in automatic constant speed propeller mechanism whereby the engine speed is maintained constant for varying load conditions in response to automatic pitch setting of the propeller blades.

It is among the objects of the invention to provide a variable pitch propeller mechanism which is adapted to automatically adjust the pitch setting in response to variations in the speed of the engine and the velocity of the plane.

It is a further object of the invention to provide a simple compact design of automatic pitch setting mechanism which will especially adapt the invention to the smaller range of airplane motors from 75 to 300 horsepower. The unit hereinafter described is especially designed to be economically produced, the main feature being the elimination of auxiliary equipment such as governor pads, drive gears, drilled leads, etc.

Figure 3:
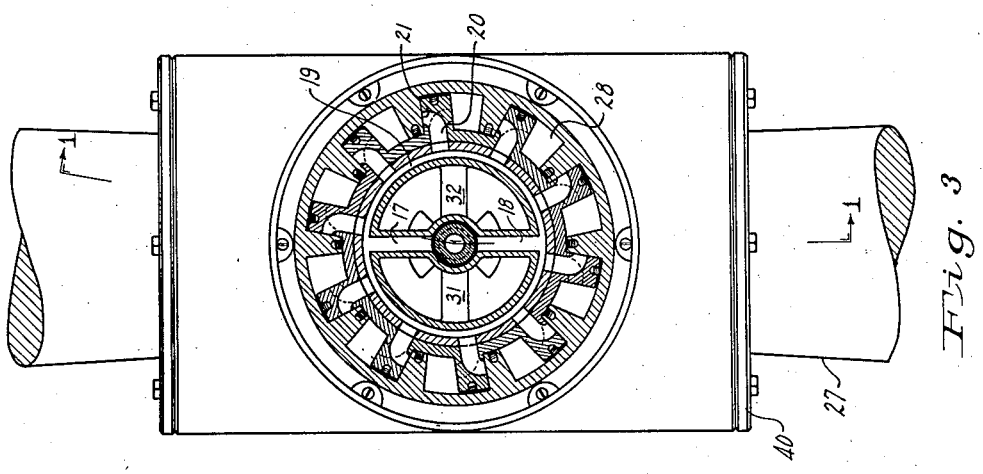
Figure 2:
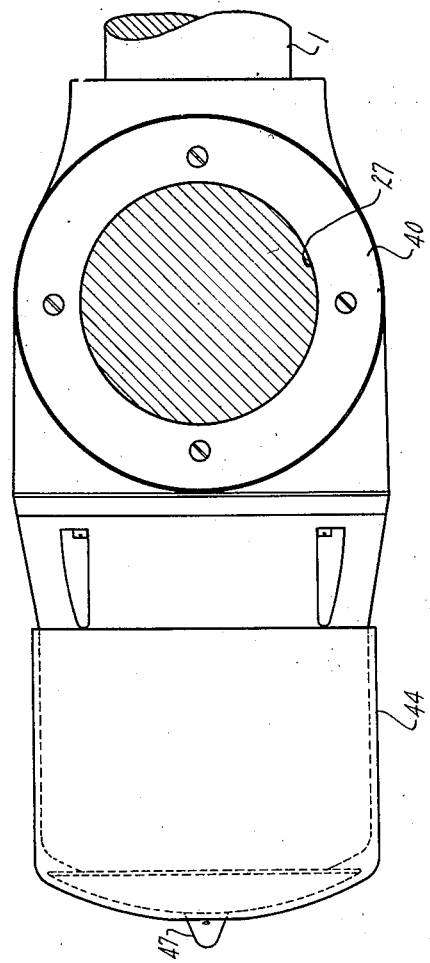

The invention will become more apparent from a consideration of the accompanying drawings constituting a part hereof in which like reference characters designate like parts and in which:

Fig. 1 is a cross-sectional view partially in elevation of a constant speed propeller unit and a fragmentary portion of the airplane motor;

Fig. 2 a top plan view thereof partially in cross-section;

Fig. 3 a transverse cross-section partially in elevation taken along the line 3—3, Fig. 1; and Fig. 4 a cross-sectional view partially in elevation of the propeller hub and nose of the engine with a booster pump built in the hub structure.

With reference to Fig. 1 of the drawings, the numeral 1 designates a hollow crank shaft of the motor, the end housing of which is designated by the numeral 2. In practically all small engines oil pressure is available at the front end of the crank shaft, this pressure being the source of power for controlling and operating the propeller pitch setting mechanism. This source of oil pressure is the lubricating oil of the motor which is conducted to the hollow interior of the crank shaft 1 through a drill lead 3, the oil pressure being regulated by a control valve 4, which is not essential.

Disposed within the crank shaft 1 is an auxiliary tube 5 of aluminum which is shrunk into the hollow interior of the crank shaft, the oil flowing around the periphery of the aluminum tube through an annular passage 6 from which it is routed through passages 7 and 8 to port 9, controlled by a governor valve 10.

From this point it is automatically routed to increase or decrease the pitch setting of the propeller by action of the governor flyweights 11 and 12 that are pivotally mounted at 13 and have engagement with the governor valve 10 by arms 14 that coact with a flange 15 of the governor valve.

The governor valve 10 moves forward against the tension of a speeder spring 16 that is calibrated to maintain the governor valve in normal position at 2100 R. P. M.

When the R. P. M. of the motor increases, flyweights 11 and 12 move outwardly to displace valve 10 against the tension of the spring 16, and route the fluid from port 9 through the leads 17 and 18. The fluid is conducted from the leads 17 and 18 to a circular groove 19, Figs. 1 and 3, thence into the rotary hydraulic displacement element through the leads 20, of which there are 10 shown in Fig. 3.

The fluid pressure displacement causes rotary movement of the integrally cast vane unit 21 which transmits this rotary movement to the master gear sleeve 22, Fig. 1, having a beveled gear 25 interacting with the teeth of the beveled gears 26 on the ends of the propeller blades 27 to increase or decrease the pitch setting of the blades as the case may be. The master gear sleeve 22 is secured to the rotary vane element 21 by a key 22a.

As the flyweights move radially outward to connect the fluid pressure from the engine to the rotary displacement element through the leads 20 against the vane element 21, fluid chambers 28 are simultaneously uncovered for atmospheric drain, the oil being displaced from the chambers 28 through a cast lead 29 to the annular groove 30, thence through the integrally cast web leads 31 and 32, Fig. 3, past the end of the governor valve 10 into the central part of the tube 5 from which it flows to the engine sump at the exit 33.

The propeller blade, as shown in Fig. 1, is mounted on a combination blade end gear and preloaded bearing designated by the numeral 26a which is doweled to the blade ends 34 by dowel pins 35. The main hub 36 may be a stainless steel casting to reduce cost of manufacture. The hub is ground all over and the modified buttress threads 37 are also ground to take the thrust of a coined magnesium blade 27 or any of the types of lightweight blades. The packing 38 and retaining ring 39 are secured by a lock plate 40. A stationary valve element 41, which is of hardened and ground steel, is shrunk into the governor oil distributor body.

Another automatic control feature, operable by wind velocity, is a pressure plate 42 in the nose of the governor housing. The pressure plate 42 is provided with a plate spring 43 that acts against the governor valve shaft 44, it being normally biased outward by a coil spring 45. When the pressure plate 42 is subjected to external air pressure, it acts through the plate spring 43 to increase the initial tension of the governor speeder spring 16.

As shown in Fig. 4, a booster pump mechanism may be embodied in the propeller hub structure to make the propeller and pitch actuator a self-contained unit. The booster pump consists of a series of pistons 50 having projecting ends 51 extending from the back end of the hub for engagement with a stationary cam 52 that is attached to the engine nose 2.

The pump stems 51 are held in contact with the cam 52 by springs 51a. As the pump plunger 50 advances in its stroke it forces the oil to chamber 53 and thence through the duct 54 leading to the governor control valve. Upon return stroke of plunger 50, check valve 53a maintains the oil pressure in duct 54. The duct 55 returns the oil from the oil chamber in the dome which is designated by the character A, and when the propeller blades are in such position as to have the engine put "on speed," the fluid is by-passed by check valve 56 from conduit 54 to the return conduit 55.

The operation of the above described constant speed propeller mechanism is briefly as follows:

Assuming that the R. P. M. of the motor is 2,100 at normal operation and speeder spring 16 is calibrated to maintain the governor valve in normal position, as shown in Fig. 1, at this speed, if the engine speed increases due to the falling off of the propeller load as in cruising, the flyweights 11 and 12 will move radially outward, displacing governor valve 10 in a forward direction, thereby routing the pressure fluid from the lead 7 through the port 9, thence through leads 17 and 18 to the annular passage 19, and then to the angularly spaced leads 20 against the vanes 21 of the rotor.

Upon displacement of the motor, the sleeve 22 is rotated, subjecting the master gear 25 to angular movement which, through coaction with the propeller blade end gears 26, causes an adjustment of the pitch angle of the propeller blades.

Simultaneously, the fluid from chambers 28 is routed into the hollow interior of the aluminum tube 5 through the outlet passage 33 to the engine sump. When because of the increased pitch setting the engine speed is decreased to normal, the flyweights 11 and 12 will restore the governor valve to the normal position, as shown in Fig. 1.

There are no normal controls for the pilot to manipulate during any stage of operation of the plane. The constant speed propeller mechanism is designed to be fully automatic. In the take-off and climb, if the engine is designed to produce its maximum horsepower at 2,100 R. P. M., the governor flyweights, as controlled by the speeder spring 16, will respond even at slight fluctuations of R. P. M. to reset the pitch to allow the engine to put out its full horsepower.

With full throttle and full horsepower available for giving maximum performance and efficiency in take-off and climb, assuming the forward speed of the plane to be 40 miles an hour, the velocity flow and air pressure on pressure plate 42 is sufficient to compress the pressure plate spring 43, thereby increasing the initial tension of the flyweight speeder spring 9. Since the flyweights are no longer responsive to an increase in speed over 2,100 R. P. M., the engine R. P. M. will slowly decrease and when the velocity of the plane reaches from 80 to 100 miles an hour, the engine speed will be about 1,800 R. P. M., at which it will remain substantially constant as long as the forward speed velocity is maintained, and even in a power dive.

When the plane is again headed to climb at full throttle, the forward speed falls off with the angle of the climb, and the pressure plate will move forward to release the tension on the speeder spring 16, and the motor will gradually increase its speed to 2,100 R. P. M., giving maximum horsepower and thrust. When landing with partially throttled motor, and the forward speed has fallen to 40 miles per hour or less, the pressure plate automatic control will again without attention make available the maximum safe R. P. M. and horsepower.

For winter operation, a thin section of rubber 44a is placed over the dome and pressure plate 42, as shown in Fig. 1, to exclude water from between the dome and pressure plate. The initial tension of both the speeder spring 16 and the pressure plate spring 43 can be readily adjusted by nuts 45a and 46. The pressure plate can be readily removed by removal of the cotter key 46a and knurl nut 47. Packing gland 48 is provided to seal against external oil leaks as the entire hub is under the full pressure of the lubricating oil of the engine.

The automatic R. P. M. control is particularly suitable for all types of light plane usage and for military purposes such as primary training schools. It is of a low manufacturing cost, all parts involved in the governor and rotary hydraulic torque unit being die cast aluminum with practically no machine work.

Although one embodiment of the invention has been herein illustrated and described, it will be evident to those skilled in the art that various modifications may be made in the details of construction without departing from the principles herein set forth.

I claim:

1. A variable pitch propeller mechanism comprising a propeller hub adapted for mounting on the end of the engine shaft, a propeller blade mounted for rotary movement about its own axis in said hub, said blade having an end gear, a pitch actuating mechanism mounted on said propeller hub consisting of a housing forming an extension on said hub, a rotor mounted in said housing, a master gear engaging the end gear of the blade keyed to the rotor to be movable therewith, a stationary valve element having flow passages for routing fluid to said rotor, a movable valve element controlling the flow of fluid to the rotor, flyweights mounted on the stationary valve element for engaging the movable valve element to actuate the latter in response to speed variations of the engine shaft, a speeder spring normally biasing said valve against the action of the flyweights, said spring being preloaded to maintain the flyweights inactive below a predetermined speed, a conduit in the engine shaft for routing the lubricating fluid of the motor to said valves, the conduit being spaced from the engine shaft to form a fluid flow passage to the valves, and the interior of the conduit constituting a return passage for the fluid to the engine sump, a nose plate externally of the actuator housing, a spring plate attached to be movable therewith, said spring plate being adapted to increase the load on the speeder spring whereby the pitch setting is regulated in response to the wind pressure on the nose plate.

2. A variable pitch propeller mechanism comprising in combination a propeller hub mounted for rotation on an engine shaft, a propeller blade mounted for rotary movement about its own axis in said hub having an end gear, a hydraulic actuator having a master gear coacting with the end gear of the propeller blade, a rotor attached to said master gear, said rotor comprising a plurality of angularly spaced stationary abutments and a rotor having radially disposed vanes for engagement with said stationary abutments, fluid passages extending through the stationary abutments and being exposed to the movable vanes, an annular flow passage communicating with the flow passages of said abutments, a stationary valve element having flow passages communicating with the annular passage and a movable valve element adapted to control the flow of fluid through said stationary flow passages, a governor flyweight mechanism for actuating the movable valve element, a speeder spring for preloading said flyweights to render the governor valve operative at predetermined speeds, and means responsive to external wind pressures for varying the load on said speeder spring.

3. A variable pitch propeller mechanism comprising a hub structure, a propeller blade mounted for angular movement therein, said blade being normally held against a fixed limit stop, a pitch changing mechanism mounted on said hub operatively connected to said blade to subject it to angular pitch adjusting movement, a source of power for actuating the pitch setting mechanism, means responsive to the engine speed for regulating the degree of pitch adjusting movement, and means responsive to variations in pressure of the external wind velocity for modifying the action of said last-named means.

4. In a variable pitch propeller mechanism, a hub structure, a propeller blade mounted for angular movement therein, a pitch change actuator for said blade, connecting means for said blade and actuator to render it operable, said blade being normally held against movement by a fixed limit stop, means responsive to the speed of the propeller for energizing and controlling said actuating means, and a control means for said last-named means responsive to variations in pressure of the external wind velocity to modify the pitch setting movement of the blade.

5. A variable pitch propeller mechanism comprising a hub, a propeller blade mounted for angular movement against a fixed limit stop in said hub, fluid pressure means for moving said blade to its pitch adjusting position, a governor flyweight actuated valve controlling the application of the fluid pressure, means normally biasing the flyweight force for maintaining a pitch setting of the blades for a predetermined engine speed, and means responsive to variations in pressure of the external wind velocity for modifying said valve biasing means.

6. A variable pitch propeller mechanism comprising a hub structure mounted on the crank shaft of an engine, a hydraulic actuator mounted on the hub, a propeller blade mounted for angular pitch adjusting movement in said hub, means connecting said blade to said actuator to be movable thereby, said actuator comprising a plurality of angularly spaced stationary abutments and a rotary member having an equal number of angularly spaced abutments adapted to coact with said stationary abutments, said rotor being connected to the propeller blade, fluid pressure means for displacing said movable abutments to actuate the blade, valve means controlling the flow of the pressure fluid, a governor flyweight mechanism connected to subject the valve to flow controlling movement, a speeder spring for preloading said governor weights to maintain a predetermined R. P. M. of the engine, and means responsive to the external wind velocity for modifying the load of the speeder spring.

7. A variable pitch propeller mechanism comprising in combination with an adjustable pitch propeller of pitch adjusting mechanism including a pitch setting actuator, a governor control having a fly-weight actuated valve for energizing said actuator, the fly-weights of said governor control being movable in response to variations in the engine speed to actuate said valve for adjusting the pitch setting of the blade, and means exposed to and responsive to variation in pressure of the external wind velocity for regulating the action of the fly-weights independently of the engine speed.

8. A variable pitch propeller mechanism comprising in combination with an adjustable pitch propeller of pitch adjusting mechanism including a pitch setting actuator, a governor control having a fly-weight actuated valve for energizing said actuator, the fly-weights of said governor control being movable in response to variations in the engine speed to actuate said valve for adjusting the pitch setting of the blades, a speeder spring for preloading the fly-weights to restrain their controlling movements below a predetermined engine speed, and means responsive to variations in pressure of the external wind velocity for varying the loading of said speeder spring.

9. A variable pitch propeller mechanism comprising in combination with an adjustable pitch propeller having pitch adjusting mechanism including a pitch setting actuator of a governor control for energizing said actuator, said governor having fly-weights movable in response to variations in the engine speed, a speeder spring for preloading the fly-weights to restrain their controlling movements below a predetermined engine speed, and means responsive to variations in pressure of the external wind velocity for varying the load of said speeder spring, said means comprising a shaft having a shoulder abutting one end of the spring, said shaft extending outside the actuator housing, a nose plate disposed around the end of said shaft and a spring plate attached to the nose plate for engaging said shaft whereby in response to movement of the nose plate by change in external wind velocity the pressure exerted on the plate reacts against the speeder spring.

10. In a variable pitch propeller, a propeller blade mounted for angular pitch adjustment, an actuator including a governor fly-weight control for effecting said pitch adjustment in response to variations of the propeller speed, and means coacting with said actuator to effect pitch adjusting movement in response to variations in the pressure of the external wind velocity.

11. In a variable pitch propeller, a propeller blade mounted for angular pitch adjustment, an actuator including a governor fly-weight control connected to the blade to effect said pitch adjustment, a pressure responsive device for controlling said actuator mounted to be exposed to variations in the external wind velocity, and a flexible housing for said pressure responsive device to protect the same from atmospheric elements.

WALTER S. HOOVER.